US011136966B1

(12) United States Patent
Sopoglu et al.

(10) Patent No.: US 11,136,966 B1
(45) Date of Patent: Oct. 5, 2021

(54) SYSTEM AND METHOD FOR DETERMINING THE WIND YAW MISALIGNMENT OF A HORIZONTAL AXIS ON-SHORE WIND TURBINE

(71) Applicant: OVIDIU DEVELOPMENT SA, Bucharest (RO)

(72) Inventors: Laurentiu-Dragos Sopoglu, Constanta (RO); Liviu Cristian, Constanta (RO)

(73) Assignee: OVIDIU DEVELOPMENT SA, Bucharest (RO)

( * ) Notice: Subject to any disclaimer, the term of this patent is extended or adjusted under 35 U.S.C. 154(b) by 0 days.

(21) Appl. No.: 17/239,470

(22) Filed: Apr. 23, 2021

(51) Int. Cl.
*F03D 7/04* (2006.01)
*F03D 17/00* (2016.01)
*G01S 17/95* (2006.01)

(52) U.S. Cl.
CPC .......... *F03D 17/00* (2016.05); *F05B 2260/83* (2013.01); *G01S 17/95* (2013.01)

(58) Field of Classification Search
CPC .. F03D 7/0204; F03D 7/047; F05B 2270/329; F05B 2270/8042; F05B 2270/321; F05D 2270/32
See application file for complete search history.

(56) References Cited

U.S. PATENT DOCUMENTS 8,901,763 B2 * 12/2014 Bowyer ................ F03D 7/0204
290/44
10,465,655 B2 * 11/2019 Brake ..................... F03D 7/048

2013/0099497 A1 * 4/2013 Bowyer .................. F03D 7/042
290/44
2014/0035285 A1 * 2/2014 Creaby ................. F03D 7/0268
290/44
2017/0175710 A1 * 6/2017 Egedal .................... F03D 13/30

FOREIGN PATENT DOCUMENTS

| EP | 2599993 | 6/2013 |
| EP | 3181896 | 6/2017 |
| WO | WO2016008500 | 1/2016 |

OTHER PUBLICATIONS

Bang et al., "Alternative Methodologies for LiDAR System Calibration", Thesis, Department of Geomatics Engineering, Sep. 2010, 178 pages.
EP Extended Search Report in European Appln. No. 20465522.9, dated Oct. 29, 2020, 5 pages.
Fleming et al., "Field-test results using a nacelle-mounted lidar for improving wind turbine power capture by reducing yaw misalignment", Journal of Physics, Conference Series 524, 2014, 11 pages.

* cited by examiner

*Primary Examiner* — Eldon T Brockman
(74) *Attorney, Agent, or Firm* — Fish & Richardson P.C.

(57) ABSTRACT

This invention relates to system for determining the wind yaw misalignment of a horizontal axis on-shore wind turbine comprising the wind turbine, a lidar, a topographical station, an external computing unit and a telecommunication network connecting them. Said wind turbine further comprises two target points made of reflective materials placed on the external surface of the nacelle on its side facing the ground, such that be detected by the topographic station. The lidar is configured to determine wind direction angle in respect to the north and wind speed, the topographic station is configured to determine the geographical position and orientation of the pair of target points. The lidar and the topographical station communicate the values determined to the external computing unit.

10 Claims, 3 Drawing Sheets

SYSTEM AND METHOD FOR DETERMINING THE WIND YAW MISALIGNMENT OF A HORIZONTAL AXIS ON-SHORE WIND TURBINE

CROSS REFERENCE TO RELATED APPLICATION

This application claims priority to European Application No. 3763939, filed Apr. 29, 2020, the contents of which are incorporated by reference herein.

FIELD OF THE INVENTION

The invention is related to the field of wind turbines. In particular the invention is related to a system and method for determining the wind yaw misalignment of a horizontal axis on-shore wind turbine, to a computer program and to a computing unit for carrying the method.

BACKGROUND OF THE INVENTION AND TERMS USED IN THE INVENTION

The main components of an on-shore wind turbine are as follows, with reference to FIG. 1.

A plurality of rotor blades 1 captures the wind by lifting and rotating when the wind blows over them, causing a rotor 3 to spin.

A rotor hub 2 holding the plurality of rotor blades 1 and the rotor 3, said rotor hub 2 connecting the rotor blades 1 to the shafts: a high speed 9 shaft and a low speed shaft 3.

The low speed 3 shaft alternatively called the rotor shaft 3 connects the rotor hub 2 to a gearbox 8 by means of pipes and hydraulics means.

A nacelle 4 accommodates the key components of the turbine including a gearbox 8, the low and high speed shafts 3, 9, a generator 10, a turbine computing unit 7 and a brake 11. It is usually big enough to enable operators to enter for maintenance and installation operations of the components accommodated.

A tower 5 for the purpose of carrying on top of it the nacelle 4 and the rotor 2.

An anemometer 6 and a wind vane are used to measure the speed and the direction of the wind. Usually the anemometer 6 measures the wind velocity whereas the wind vane usually measures the wind direction. The data from anemometer 6 are used to control the rotational positions of the rotor blades 1, whereas the data from the wind vane are used to control the rotational position of the nacelle 4, and hence of the wind turbine. Modern turbines use ultrasonic anemometers that measure both the speed and the direction of the wind.

A turbine computing unit 7 for electronically operating and controlling the functioning of the wind turbine, including the yaw mechanism 13.

The gearbox 8 connects the low-speed shaft 3 to the high-speed shaft 9 by increasing the rotational speeds to reach the speeds required by generators to produce electricity.

The high speed shaft 9 drives the electrical generator 10.

The electrical generator 10 is the one that turns the energy from the wind blowing over the rotor blades 1 into electricity.

The brake 11 that stops the rotor 3 in case of emergency.

Pitch control device(s) 12 are used to operate and control the speed and the angle of the rotor blades in a wind turbine.

A yaw actuator used to orient upwind the turbine in order to keep them facing the wind when wind direction changes powered by a yaw motor.

Depending on the position of the rotor in respect to the ground, the on-shore wind turbines are of two types: horizontal axis wind turbines, when the two shafts, namely the low- and high-speed shaft are parallel to the ground and vertical axis wind turbines, when the two shafts are perpendicular to the ground.

Relevant for the invention are the horizontal axis on-shore wind turbines. Therefore, hereafter the terms "turbine" or "wind turbine", used alternatively, shall refer to the horizontal axis on-shore wind turbines.

The term "in front of the turbine" relates to the position in front of the rotor blades that is the direction from where the wind blows, said wind being called "inflow wind" whereas the term "behind the turbine" refers to the position opposite to the rotor blades that is the direction from where the wind blows away from the turbine.

It is known from the state of art that the wind turbine must be correctly and permanently yawed into the wind, in order to produce maximum of energy.

Correct yawing is when the nacelle is parallel with the inflow wind.

In order to ensure that the nacelle is parallel with the wind, the wind turbines use the so-called "yaw mechanism" alternatively called "yawing" or "yaw alignment", all terms designating a process by which an actuator is used to turn the nacelle of the wind turbine with the rotor to the wind. The expression "re-align the wind turbine with the wind" is used in this invention to define the situation when the nacelle is aligned such that it is parallel with the wind.

The yaw mechanism is operated by an actuator, said actuator being operated in turn either by the turbine computing unit or by the anemometer.

In order to enable the yaw mechanism, it is very important to provide measurement as accurately and updated as possible of the misalignment.

The term "misalignment" refers to the relative change of the direction of the nacelle in respect to the direction of the wind. Ideally, when the nacelle is aligned with the wind, the misalignment is of 0°.

Throughout this invention, the term "wind direction" stands for the horizontal component of the wind essentially at the hub height, whereas the term "wind speed" stands for the horizontal component of the wind essentially at the hub height.

The term "essentially at the hub height" refers to the hub height measured vertically from the ground to the horizontal axis of the rotor hub with a tolerance ∓ of up to 3 meters due to the usual dimensions of the rotor hub and due to usual location of the ensemble anemometer and wind vane opposite the rotor hub in respect to the rotor shaft and above said rotor shaft.

Traditionally, the wind yaw misalignment is determined by the ensemble anemometer and wind vane. Modern anemometers carry out an average of the misalignment for a pre-determined yaw interval of time and, if said average is above a pre-determined misalignment threshold, send instructions either to the turbine computing unit or directly to the actuator, in order to re-align the wind turbine with the wind.

Use of anemometers and/or wind vanes together with a nacelle-mounted lidar is one of the solutions known in the state of art. The authors P. A. Fleming, A K Shcholbrock, A Jeju, S Devoust, E Osler, A D Wright and A Clifton concluded in 2014 after a study in which a nacelle-mounted lidar was used to improve the yaw alignment of an experimental turbine that "Results demonstrated that the correction learned by the lidar significantly improved power capture compared to the uncorrected measurement of the nacelle vane".

Disadvantages of Prior Art

Determination of the misalignment only by anemometer and a wind vane is affected by numerous errors, the majority of them stemming from the location of said anemometer and wind vane in a place where the movement of the blades and the wind turbulences affect the correct measurements. Moreover, it is known that there are inherent errors of design of the system of determining azimuthal direction by the computer of the turbine. Said inherent errors impair the correct determination of the misalignment.

Despite the improvement of the determination of the misalignment using laser radiation or lidar as compared with the measurements carried out only by the anemometer and the wind vane, using laser radiation or using lidar for the determination of the misalignment of the wind turbine is still subject to many errors, both systematic and random errors. For example, in case of lidar, the thesis Alternative Methodologies for LiDAR System Calibration, by author Ki In Bang states that: "The random errors are caused by the fact that repeated observations usually display a normal frequency distribution, while the systematic errors follow some physical law and thus can be predicted (Mikhail and Ackerman, 1976; Wolf and Ghilani, 1997)" and that: "The systematic errors, on the other hand, are mainly caused by biases in the boresight angles and lever-arm offsets relating the system components as well as biases in the system measurements such as encoder angles and laser ranges."

The main errors using lidar for the determination of the misalignment of the wind turbine as observed by the inventors refer to the GPS orientation of the internal compass of the lidar and to the fact that in some locations the GPS signal was systematically weak.

Problem Solved by the Invention

The problem solved by the invention is to improve the accuracy of the determination of the wind yaw misalignment of a horizontal axis on-shore wind turbine.

SUMMARY OF THE INVENTION

In a first aspect of the invention it is provided a system for determining the wind yaw misalignment of a horizontal axis on-shore wind turbine T comprising the wind turbine T, said wind turbine T comprising a plurality of rotor blades 1, a rotor hub 2 situated at a hub height HH, a rotor shaft 3 having a rotor shaft 3 horizontal axis, a nacelle 4, a tower 5 having a tower base: wherein said wind turbine T further comprises a pair of target points X and Y on the external surface of the nacelle 4 on its side facing the ground arranged such that their geographical positions are determinable by a topographic station S, and such that the segment XY connecting the target points X and Y corresponds to the longitudinal axis of said side of the nacelle 4 facing the ground, target point X being placed at the extremity of the nacelle 4 opposed to the plurality of rotor blades 1 and target point Y being placed in the immediate vicinity of the tower 5;

wherein the turbine T has a turbine reference position, in which the rotor shaft 3 has a rotor shaft 3 horizontal axis reference position, wherein the system further comprises:
 a ground-based lidar L, mounted with its axis oriented vertically, the lidar L comprising a lidar measuring and computing unit LMCU, said lidar measuring and computing unit LMCU configured:
  to determine an angle θ of the wind direction in respect to the Geographical North at essentially the hub height HH;
  to determine a wind speed v at essentially the hub height HH;
  to send via the telecommunication network N to the external computing unit EC the results of the determinations;
 wherein the lidar L has a lidar reference position B, in which the lidar L is placed on the ground in front of the turbine T in turbine reference position on the projection on the ground of the rotor shaft 3 horizontal axis reference position, at a distance $d_1$ from the projection on the ground C1 of an extreme point C of the rotor hub 2, and
 wherein the nacelle 4 is movable depending on the wind direction to a plurality of positions i on each side of the projection on the ground of the rotor shaft 3 horizontal axis reference position, making an angle $α_i$ between the projection on the ground of the rotor shaft 3 horizontal axis reference position and the projection on the ground of the rotor shaft 3 horizontal axis corresponding to each of the plurality of positions i,
 the ground-based topographic station S, comprising a topographic station measuring and computing unit SMCU, the topographic station measuring and computing unit SMCU configured:
  to determine at least the geographical position of the pair of target points X and Y;
  to send via the telecommunication network N to the external computing unit EC the results of determinations;
 wherein the ground topographic station (S) is placed in either of two topographic station reference positions D' and D" behind the rotor hub 2 and laterally in respect to the projection on the ground of the rotor shaft 3 reference position horizontal axis at a distance $d_2$ from the base of the tower 5, such that, when the nacelle 4 is movable depending on the wind direction:
  the rotor blades 1 do not interfere with the laser beam of the topographic station measuring and computing unit SMCU, and
  the topographic station measuring and computing unit SMCU be able to determine the geographical position of the pair of the target points X and Y of the nacelle 4 during the movement of said nacelle 4 to the plurality of positions i,
 the external computing unit EC configured:
  to receive the input data via the telecommunication network N:
   the angle θ of the wind direction from the lidar measuring and computing unit LMCU;
   the geographical position of the pair of target points X and Y, from the topographic station measuring and computing unit SMCU;
  And to store the received input data;
  to determine an angle ε of the orientation of the nacelle 4 in respect to the Geographical North based the geographical position of the pair of target points X and Y, and to store each determination;
  to determine an adjusted angle $θ_{adj}$ of the wind direction;
  to average the adjusted angle $θ_{adj}$ of the wind direction and the wind speed v, to verify if the averaged wind speed $v_{avg}$ is comprised within a predetermined interval of wind speeds $v_1$-$v_2$ for which wind yaw misalignment can be determined, and to store the averaged angle $\theta_{avg}$ of the wind direction and the averaged wind speed $v_{avg}$;

to determine a wind yaw misalignment σ of the turbine T in respect to the wind direction and to store each determination;

to determine an averaged wind yaw misalignment $\sigma_{avg}$ of the turbine T in respect to the wind direction corresponding to a duration Δt, to store the averaged misalignment $\sigma_{avg}$ and to compare said average misalignment $\sigma_{avg}$ with a predetermined misalignment threshold, the telecommunication network N configured:
to ensure communication between the external computing unit EC and the lidar measuring and computing unit LMCU and the topographic station S,
wherein the system is being configured such that the external computing unit EC be able to determine wind yaw misalignment $\sigma_{avg}$ of the turbine T in respect to the wind direction based on the determinations received from the ground-based topographic station S and the ground-based lidar L.

In a second aspect of the invention it is provided a method for determining the wind yaw misalignment of the horizontal axis on-shore wind turbine T using the system according to the invention, the method comprising the following steps to be carried out during the duration Δt:

S1 Determining for a n number of times, by the lidar measuring and computing unit LMCU of the ground-based lidar L, of the angle θ of the wind direction in respect to the Geographical North at essentially the hub height HH,
determining by the lidar measuring and computing unit (LMCU), of the wind speed v at essentially the hub height HH, and
sending, by the lidar measuring and computing unit LMCU, the results of determinations to the external computing unit EC via the telecommunication network N,
determining for a m number of times, by the topographic station measuring and computing unit SMCU, of at least the geographical position of the pair of target points X and Y, and
sending the results of determinations to the external computing unit EC via the telecommunication network (N), S2 Receiving by the external computing unit EC of the input data via the telecommunication network N: the angle θ of the wind direction, and the at least geographical position of the pair of target points X and Y, and storing received input data, S3 Determining by the external computing unit EC of the angle ε of the orientation of the nacelle 4 in respect to the Geographical North based the geographical position of the pair of target points X and Y, and storing the result of this step, S4 Applying a validation condition by checking if the angle θ of the wind direction has a value which is comprised within the values of a closed interval defined by the predetermined maximum value $\alpha_{max}$ of the angle $\alpha_i$, on each of the sides of the rotor shaft 3 horizontal axis reference position,
selecting only the values of the angle θ of the wind direction that satisfy said validation condition,
determining an adjusted angle $\theta_{adj}$ of the wind direction for each of the validated values using a first compass rose condition, and storing the result of this step, S5 Averaging by the external computing unit EC for an averaging duration Δtt, where Δtt<Δt, of the adjusted angle $\theta_{adj}$ of the wind direction and of the wind speed v, resulting the averaged angle $\theta_{avg}$ of the wind direction and the averaged wind speed $v_{avg}$,
verifying if the averaged wind speed $v_{avg}$ is comprised within the predetermined interval of wind speeds $v_1$-$v_2$ for which the following steps method are applied, and storing the result of this step, S6 Determining by the external computing unit EC of the wind yaw misalignment σ of the turbine T in respect to the wind direction as a difference between the averaged angle $\theta_{avg}$ of the wind direction and the angle ε of the orientation of the nacelle 4, using the equation:

$$\sigma = \theta_{avg} - \varepsilon \qquad [\text{Eq.4}], \text{ and}$$

storing the result of this step,

S7 Determining by the external computing unit EC at the expiry of the duration Δt, of the averaged wind yaw misalignment $\sigma_{avg}$ of the turbine T in respect to the wind direction corresponding to said duration Δt as an arithmetic mean of the plurality of values of the wind yaw misalignment σ during the duration Δt, storing the averaged misalignment $\sigma_{avg}$ of the turbine T as result of the method and comparing said average misalignment $\sigma_{avg}$ with the predetermined misalignment threshold in order to check if re-alignment into the wind of the turbine T must be carried out.

In a third aspect of the invention it is provided a computer program comprising instructions which, when the program is executed by the external computing unit EC of the system causes the computer to carry out the steps of the method from step 2 until step 7 inclusive.

In a fourth aspect of the invention, it is provided the external computing unit EC of the system having stored thereon the computer program of the third aspect of the invention.

Advantages of the Invention

Improving the accuracy of the determination of the wind yaw misalignment of the horizontal axis on-shore wind turbine;

As a result of the improved accuracy of the determination, improving the correction of the position of the nacelle in respect to the wind, leading to increasing yield of the production of energy by the turbine.

LIST OF REFERENCES IN THE DRAWINGS

Figure 1:
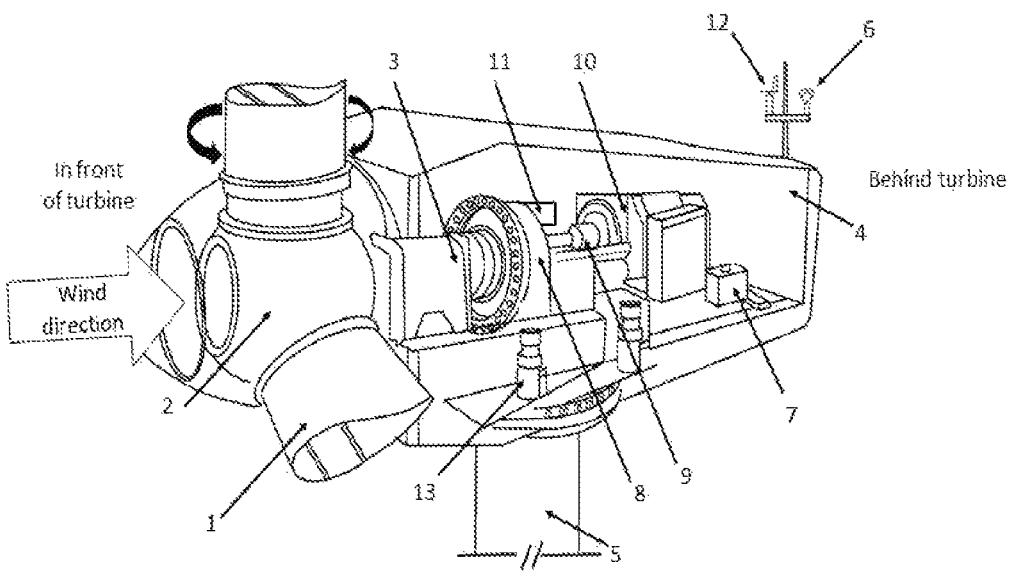
FIG. 1 components of a horizontal axis on shore turbine according to prior art
FIG. 2 components of the system according to the invention in a view from above
FIG. 3 detail of marking the target points X and Y on the surface of the nacelle
FIG. 4 detail of positioning the lidar L with its axis vertically
FIG. 5 detail of mounting the lidar L in respect to the turbine in a vertical view
FIG. 6 schematic view of the angles according to the invention

Components of the wind turbine according to prior art:
1 rotor blades
2 rotor hub
3 rotor shaft 4 nacelle
5 tower
6 anemometer
7 turbine computing unit
8 gearbox
9 high speed shaft
10 electrical generator
11 brake
12 pitch control device
13 yaw mechanism
Components of the system according to the invention:
T wind turbine
L ground-based lidar having a vertical axis
S topographic station
EC external computing unit
N communication network
Components of the wind turbine T that are relevant for the invention:
1 rotor blades, alternatively called blades
2 rotor hub, alternatively called hub
3 rotor shaft having a rotor shaft 3 horizontal axis
4 nacelle
X, Y pair of target points and on the external surface of the nacelle 4
TCU turbine computing unit including a component for applying turbine time stamps
Components of the ground-based lidar L that are relevant for the invention:
LMCU lidar measuring and computing unit
B lidar reference position
A point where the vertical axis of the lidar L corresponding to the hub height HH
AB vertical axis AB of the lidar L
$\lambda$ angle of emission of laser beam spinning around the vertical axis AB of the lidar L
C extreme point of the rotor hub 2
C1 projection on the ground of the extreme point C of the rotor hub 2
$\alpha_i$ angle made between the projection on the ground of the rotor shaft 3 horizontal axis reference position and the projection on the ground of the rotor shaft 3 horizontal axis when, the latter corresponding to the movements of the nacelle 4 depending on the wind direction to a plurality of positions i on each side of the projection on the ground of the rotor shaft 3 reference position horizontal axis
$\alpha_{max}$ maximum pre-determined value of the angle $\alpha_i$
$d_1$ distance between the projection on the ground C1 of an extreme point C of the rotor hub 2 and LMCU lidar measuring and computing unit
Components of the topographic station S that are relevant for the invention:
SMCU topographic station measuring and computing unit
D,D' topographic station reference positions
$d_2$ distance of the topographic station S from the base of the tower 5 Angles, number of determinations and speeds:
$\Delta t$ duration of the method
the wind speed at essentially the hub height HH determined by LMCU;
$v_2$ predetermined interval of wind speeds for which for which wind yaw misalignment can be determined, corresponding to steps 8-12 of the method;
$\omega_{avg}$ averaged angle of position of the nacelle 4 in respect to the Geographical North;
$\theta$ angle of the wind direction in respect to the Geographical North;
$\theta_{adj}$ adjusted angle of the wind direction in respect to the Geographical North at essentially the hub height HH;
$\theta_{avg}$ averaged angle of the wind direction in respect to the Geographical North at essentially the hub height HH, determined by the external computing unit EC based on the adjusted angles
$\theta_{adj}$ of the wind direction during the averaging duration $\Delta tt$;
n number of determinations of the angle $\theta$ of the wind direction,
$\varepsilon$ angle of the orientation of the nacelle 4 in respect to the Geographical North based the geographical position of the pair of target points X and Y;
$\varepsilon_k$ corrected angle of position of the nacelle 4 in respect to the Geographical North, determined by the external computing unit EC;
$\varepsilon_{adj}$ an adjusted angle $\varepsilon_{adj}$ of the orientation of the nacelle 4 in respect to the Geographical North, determined by the external computing unit EC;
m number of determinations of the angle $\varepsilon$
$\Delta tt$ averaging duration for adjusted angle $\theta_{adj}$ of the wind direction and for the averaged wind speed $\theta_{avg}$;
$v_{avg}$ the averaged wind speed at essentially the hub height HH during an averaging duration
$\Delta tt$ determined by the external computing unit EC;
k nacelle correction angle, calculated as a difference between the value of the averaged angle $\omega_{avg}$ of position of the nacelle 4 and the angle $\varepsilon$ of the orientation of the nacelle 4;
$k_{avg}$ nacelle averaged correction angle, corresponding to averaging of up to m determinations of the nacelle correction angle k;
$\sigma$ misalignment of the turbine T in respect to the wind direction, calculated by the external computing unit EC;
$\sigma_{avg}$ averaged misalignment $\sigma_{avg}$ of the turbine T in respect to the wind direction calculated by the external computing unit EC corresponding to the duration of the method $\Delta t$;
North Geographical North Detailed Description and Example of Realization The system according to the invention comprises the following components, with reference to FIG. 2: a horizontal axis wind turbine T, a ground-based lidar L, a topographic station S, an external computing unit EC, and a communication network N.

The ground-based lidar L and topographic station S are referred to collectively as input apparatus.

The turbine T may be any horizontal axis on-shore wind turbine, provided that it is specially configured for the invention as it will be detailed below.

The wind turbine T comprises a plurality of rotor blades 1, a rotor hub 2 situated at a hub height HH, a rotor shaft 3, a nacelle 4, a tower 5 having a tower base.

Throughout the invention, the terms "value" and "determination" are used interchangeably to define in general the result of the determinations of the input apparatus. The terms "measurement" refers to the current understanding of the word whereas the term "determination" refers to some computation based on the measurement. The terms "instant value" or "instant determination" refer to a value determined at a specific moment of time.

In order to be used as a component of the system according to the invention, the turbine T has special configurations.

For a better understanding of the teaching of the invention, the turbine T has a reference position before the measurements and determinations take place, in which the rotor shaft 3 has a rotor shaft 3 horizontal axis reference position.

The lidar L and the topographic station S are placed in corresponding reference positions using as reference the rotor shaft 3 horizontal axis reference position.

Figure 3:
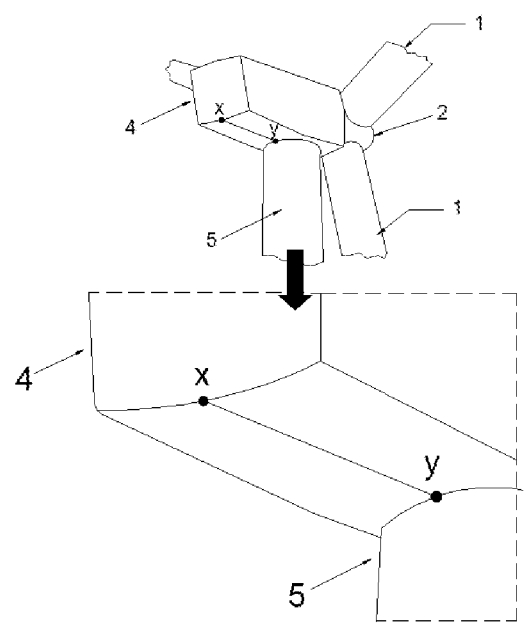

With reference to FIG. 3, the wind turbine T is configured to comprise a pair of target points X and Y on the external surface of the nacelle 4 on its side facing the ground arranged such that their geographical positions are determinable by the topographic station S, and such that the segment XY connecting the target points X and Y corresponds to the longitudinal axis of said side facing the ground of the nacelle 4, target point X being placed at the extremity of the nacelle 4 opposed to the plurality of rotor blades 1 and target point Y being placed in the immediate vicinity of the tower 5.

The term "immediate vicinity" refers to a tolerance $-\mp$ of up to 1 meter from the contact point between the nacelle 4 and the tower 5 due to the usual dimensions of the tower 5.

The lidar L is configured in the invention for the measurement of the wind speed v at essentially the hub height HH, hereafter referred to for simplicity as the wind speed v, and for determining the direction of the wind in respect to the North. Using the lidar L as a component of the system according to the invention has the advantage of accurate measurement of the wind speed v, respectively determination of wind direction and the advantage of easy and rapid installation.

Figure 4:
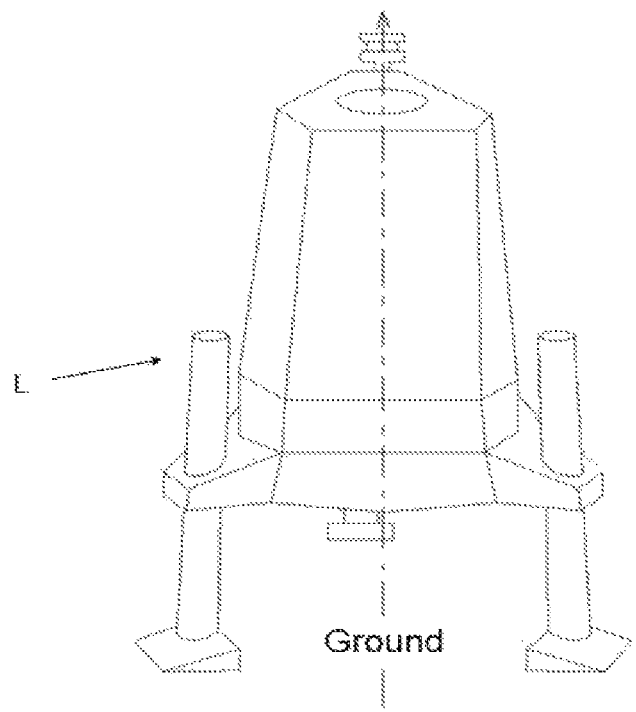

The ground-based lidar L of the system according to the invention, hereafter referred to as the lidar L, is mounted on the ground with its axis oriented vertically as shown in FIG. 4.

Placing the lidar L on the ground instead of placing in on top of the nacelle 4, as customary in the state of art, has the advantage of limiting the impact of disturbances to the measurements by the lidar L due to the interference with the permanent rotation of the blades 1.

Figure 2:
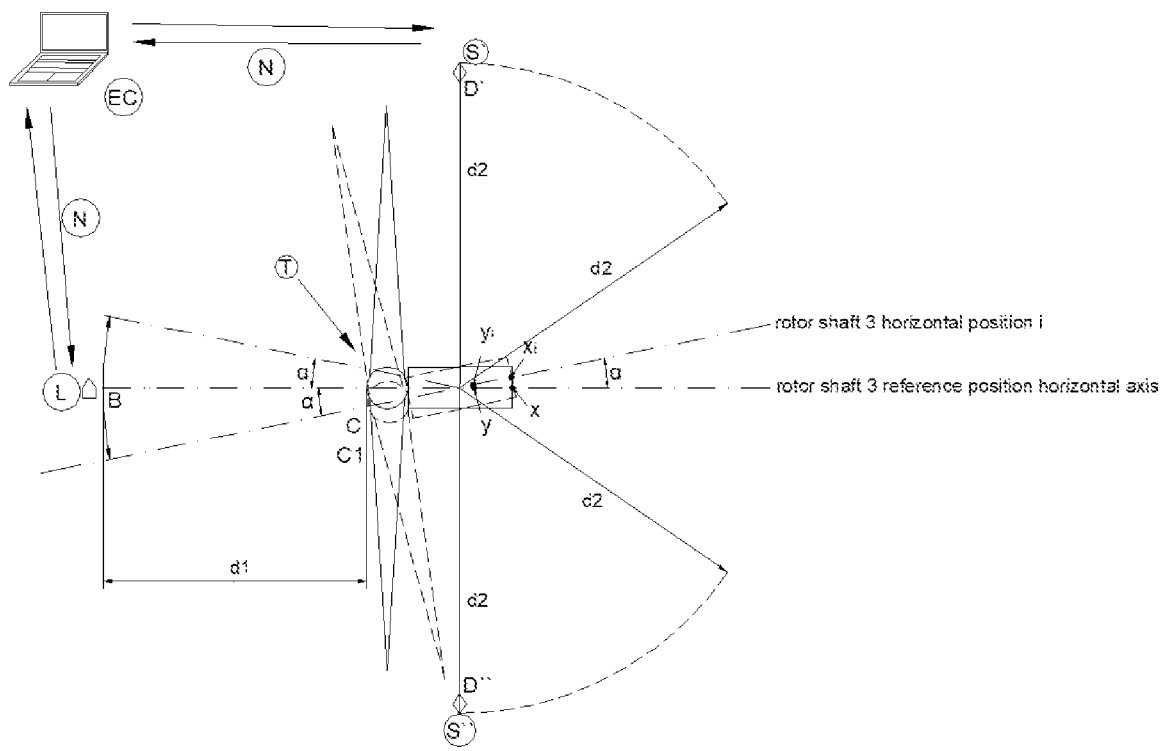

With reference to FIG. 2, in a lidar reference position B, the lidar L is placed on the ground in front of the turbine T reference position on the projection on the ground of the rotor shaft 3 horizontal axis reference position, at a distance $d_1$ from the projection on the ground C1 of an extreme point C of the rotor hub 2 such making an angle $\alpha_i$ between the projection on the ground of the rotor shaft 3 horizontal axis reference position and the projection on the ground of the rotor shaft 3 horizontal axis corresponding to each of the plurality of positions i, when the nacelle 4 moves depending on the wind direction to a plurality of positions i on each side of the projection on the ground of the rotor shaft 3 horizontal axis reference position.

For simplicity, FIG. 2 shows only one of the positions i from the plurality.

The lidar L comprises a lidar measuring and computing unit LMCU that includes a lidar high-precision clock.

The lidar measuring and computing unit LMCU is configured to determine a wind speed v and an angle $\theta$ of the wind direction in respect to the Geographical North at essentially the hub height HH.

The lidar measuring and computing unit LMCU is configured to send via the telecommunication network N to the external computing unit EC the results of the determinations together with a lidar time stamp corresponding to each determination.

The application of the lidar time stamp to each determination is according to prior art. The interval between two successive determinations is called granularity. Typically, the granularity of the determinations of the lidar L is between 3 s and 15 s, inclusively, its value does not limit the scope of the invention as it is given for illustrative purpose only.

The advantage of placing the lidar L as detailed above is that it ensures optimization of the capacity of the lidar L to determine the angle $\theta$ of the wind direction and the wind speed v.

The topographic station S comprises a topographic station measuring and computing unit SMCU having two configurations.

The first configuration is to determine at least the geographical position of the pair of target points X and Y. Some topographic station measuring and computing units SMCU are able to determine, based on the geographical position of the pair of target points X and Y, an angle $\epsilon$ of the orientation of the nacelle 4 made by the segment XY with the North.

The second configuration is to send the results of determinations together with a topographic station time stamp corresponding to each determination.

The topographic station S may be either manual, or automated. The topographic station measuring and computing unit SMCU includes a theodolite incorporating an electronic distance measurement device and a topographic station global positioning system for orientation of the topographic station S to the North before its use using the current national reference system.

The orientation of the topographic station S to the North is carried out according to prior art.

The minimum precision characteristics of the topographic station S in order to be used by the invention are as follows:
  precision for measurement of the distances of 2 mm+2 ppm each 3 s;
  precision for measuring distance until the pair of target points X and Y up to 500 m without reflexion prism;
  in case the topographic station measuring and computing unit SMCU is capable of determining angles, the precision for the measurement of the angle made by the segment XY with the North between of 1"-5", inclusively, that is 0.3 mgon to 1.5 mgon inclusively.

As shown in FIG. 2, the ground topographic station S is placed in either of two topographic station reference positions D' and D" behind the rotor hub 2 and laterally in respect to the projection on the ground of the rotor shaft 3 horizontal axis reference position at a distance $d_2$ from the base of the tower 5, such that, when the nacelle 4 is movable depending on the wind direction:
  the rotor blades 1 do not interfere with the laser beam of the topographic station measuring and computing unit SMCU, and
  the topographic station measuring and computing unit SMCU be able to determine the geographical position of the pair of the target points X and Y of the nacelle 4 during the movement of said nacelle 4 to the plurality of positions i.

The possible positions D' and D" are situated on two imaginary circle sectors having the radius $d_2$ the center being the base of the tower 5. When it comes to the measurement of the distance $d_2$, a tolerance of up to 2 m is accepted.

The determination of the geographical position of the pair of the target points X and Y of the nacelle 4 is made according to prior art.

The granularity of the determinations, that is the interval between two successive determinations m by the topographic station measuring and computing unit SMCU depends on the type of the topographic station S. According to prior art, if the topographic station S is manual, the granularity of interest for the invention typically ranges between 8-15 minutes, whereas if the topographic station S is automated, the granularity typically ranges between 10 and 20 s. The afore-mentioned values of granularity are given for illustrative purposes only, they do not limit the scope of the invention.

The external computing unit EC is a computing machine such as a computer or a plurality of computers located remotely from one another, communicating within a computer communication system.

The first configuration of the external computing unit EC is to receive input data via the telecommunication network N:
- the angle θ of the wind direction from the lidar measuring and computing unit LMCU;
- the geographical position of the pair of target points X and Y, from the topographic station measuring and computing unit SMCU;

The external computing unit EC may unify, if necessary, the units of measurement of the angles from the input data, and may to sort same on a time-stamp basis. For example, the external computing unit EC may use as reference for the sorting of the input data the lidar time stamps, based known level of precision the lidar high-precision clock.

The unification of units of measurement of the angles may be necessary because the input apparatus may have different ways of expressing the measure of the angles: some of them may measure angles in degrees, other in radians, number of digits may be different, the direction of measuring of the angles may be different, etc.

Another configuration of the external computing unit EC is to determine an angle ε of the orientation of the nacelle 4 in respect to the Geographical North based the geographical position of the pair of target points X and Y, and to store each determination. The angle ε of the orientation of the nacelle 4 is made by the segment XY, whose geographical position is determined by the topographic station measuring and computing unit SMCU and the geographical North. From the way the points X and Y are defined, it stems that the orientation of the segment XY in respect to the North corresponds to the orientation of the nacelle 4 to the North. This configuration of the external computing unit EC depends on ability of the topographic station measuring and computing unit SMCU to determine the angle ε, namely:

if the topographic station measuring and computing unit SMCU is able to determine said angle ε of the orientation of the nacelle 4, which is usually the case when the topographic station S is automated for example, the external computing unit EC is configured to retrieve same angle ε of the orientation of the nacelle 4, as received;

if the topographic station measuring and computing unit SMCU is not able to determine said angle ε of the orientation of the nacelle 4, for example in case of many the manual topographic stations S, the external computing unit EC is configured to determine the angle ε of the orientation of the nacelle 4 using the geographical position of the pair of target points X and Y received from the topographic station measuring and computing unit SMCU;

Another configuration of the external computing unit EC is to apply a validation condition to the angle θ of the wind direction and to determine an adjusted angle $θ_{adj}$ of the wind direction for each of the validated values of the angle θ using a first compass rose condition, and to store the result of this step.

Another configuration of the external computing unit EC is to average the adjusted angle $θ_{adj}$ of the wind direction and the wind speed v, to verify if the averaged wind speed $v_{avg}$ is comprised within a predetermined interval of wind speeds $v_1$-$v_2$ for which wind yaw misalignment can be determined, and to store the averaged angle $θ_{avg}$ of the wind direction and the averaged wind speed $v_{avg}$.

Another configuration of the external computing unit EC is to determine a wind yaw misalignment σ of the turbine T in respect to the wind direction, and to store each determination.

The last configuration of the external computing unit EC is to determine, at the expiry of a duration Δt, an averaged wind yaw misalignment $σ_{avg}$ of the turbine T in respect to the wind direction corresponding to said duration Δt, to store the averaged misalignment $σ_{avg}$ and to compare said average misalignment $σ_{avg}$ with a pre-determined misalignment threshold.

The telecommunication network N is configured to ensure communication between the external computing unit EC and the lidar measuring and computing unit LMCU and the topographic station measuring and computing unit SMCU.

In a preferred embodiment, the granularity of determinations of the topographic station measuring and computing unit SMCU is larger than a pre-determined time-interval threshold. This is in particular the case when manual topographic station S is used. The pre-determined time-interval threshold depends on the granularity of the determinations of the lidar L. For example, the granularity of the determinations of the topographic station measuring and computing unit SMCU should not be larger than 150% of the granularity of the determinations of the lidar L. For example: if the lidar L determines the angle θ of the wind direction each 10 s, the pre-determined time-interval threshold for the determinations of the angle ε of the orientation of the nacelle 4 is 150%×10 s, that is 15 s.

Should granularity of determinations of the topographic station measuring and computing unit SMCU be is larger than the pre-determined time-interval threshold, the system further comprises a third input apparatus, namely a turbine computing unit TCU of the turbine T, said turbine computing unit TCU configured to determine an averaged angle $ω_{avg}$ of position of the nacelle 4 in respect to the Geographical North and configured to send the result of the determinations to the external computing unit EC.

The determination of the averaged angle $ω_{avg}$ of position of the nacelle 4 is according to prior art. Turbine computing unit TCU exists in the absence of the invention, but it is part of the system only if the above condition regarding the pre-determined time-interval threshold is met. Typically, the granularity of the determinations of the turbine measuring unit TMU is between 8 s and 15 s, inclusively, its value does not limit the scope of the invention.

The turbine measuring unit TMU may be, for example, an ultrasonic anemometer.

When using the turbine computing unit TCU as input apparatus, the external computing unit EC has further configurations:
- to receive via the telecommunication network (N) the averaged angle $ω_{avg}$ of position of the nacelle (4);
- to determine an averaged correction angle $k_{avg}$ of the nacelle (4), for correcting the position of said nacelle (4), and to store each determination;
- to determine a corrected angle $ε_k$ of position of the nacelle (4) in respect to the Geographical North, and to store each determination,
- to determine an adjusted angle $ε_{adj}$ of the orientation of the nacelle (4) in respect to the Geographical North, and to store each determination, When using the turbine computing unit TCU as input apparatus, the telecommunication network N is further configured to ensure communication between the external computing unit EC and the turbine computing unit TCU.

Figure 5:
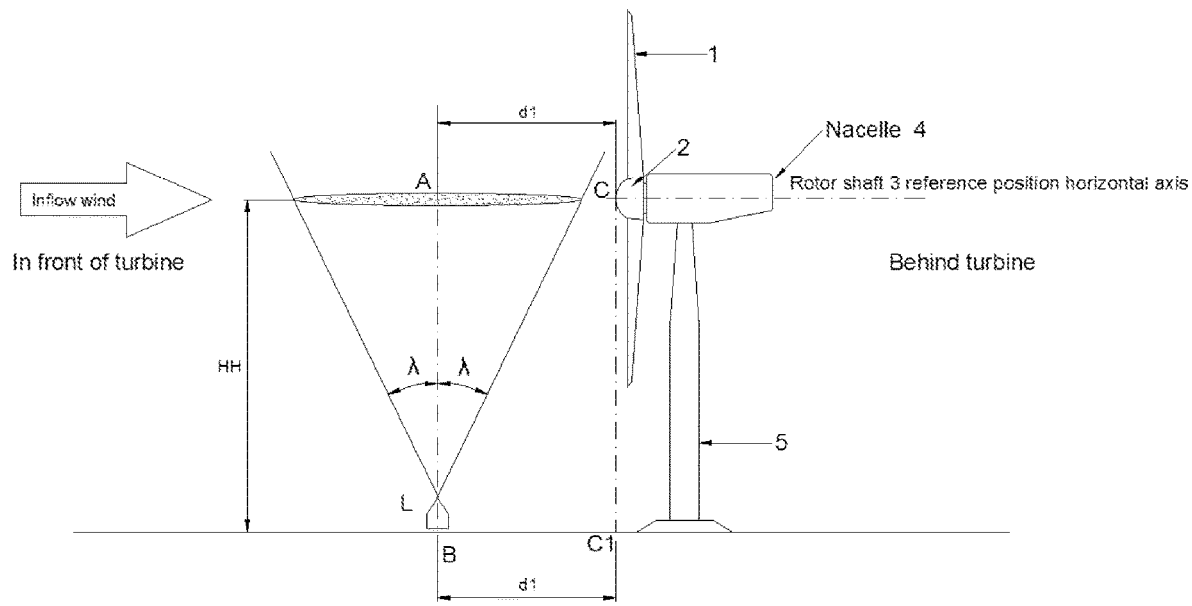

With reference to FIG. 5, in another preferred embodiment, the distance $d_1$ depends on two parameters: an angle $\lambda$ of emission of the laser beam spinning around the vertical axis AB of the lidar L on one hand, and the hub height HH on the other hand. As the laser beam is emitted through spin mirror(s) permanently spinning around the vertical axis AB of the lidar L, the emission of said laser beam is made at the angle of $\lambda$. The scanning process determines a cone having an angle of $2\lambda$ and the cone origin in point B where the lidar L is placed in the lidar reference position B. Thus, the determination of the minimum value of d1 is made using trigonometry in the right rectangle ABC, where the segment AB is equal to the hub height HH, whereas the segment $AC=BC1=d_1$ by the following equation:

$$d_{1min}=tg(\lambda)*HH \quad [Eq.1]$$

The determination of the maximum value of $d_1$ is done using the following equation:

$$d_{1max}=tg(\lambda)*2*HH \quad [Eq2]$$

The value of 2 used in the second equation is a constant depending on the characteristics of the lidar L.

In case $\lambda=30°$, which is frequent for many lidars:

$$tg(30°) = \frac{AC}{AB}$$

$$tg(30°) = \frac{\sqrt{3}}{3}$$

$$\frac{\sqrt{3}}{3} = \frac{AC}{AB}$$

Thus, in a non-limiting example when HH=100 m, and $\lambda=30°$ the minimum value of the distance $d_1$ is:

$$d_{1min} = \frac{\sqrt{3}}{3} * HH = 57.73$$

Whereas the maximum value of the distance $d_1$ is:

$$d_{1max} = \frac{\sqrt{3}}{3} * 200 = 115.47$$

Both minimum and maximum values of the distance $d_1$ may be rounded. A tolerance of up to 5% is accepted. In the example above $d1_{min}$ can be rounded up to 60 m, whereas $d_{1max}$ can be rounded to 115 m.

In another preferred embodiment, the distance $d_2$ depends on the hub height HH and on the capability of the topographic station measuring and computing unit SMCU to determine the geographical position of the points X and Y, using the equation:

$$d_{2min}=2*HH \quad [Eq.3]$$

The maximum distance $d_{2max}$ depends on the possibility that the topographic station measuring and computing unit SMCU determines the geographical position of the points X and Y. Typically the maximum distance $d_{2max}$ is around 500 m for the minimum configuration required for the topographic station S, however its value is not limiting the invention.

The advantage of placing the topographic station S as described above is that it ensures optimization of the topographic station measuring and computing unit SMCU to determine at least the geographical position of the pair of target points X and Y.

Both the lidar L and the topographic station S are maintained in their respective corresponding fixed position during the measurements and determinations.

It is possible to combine the placing of the lidar L as described above with the placing of the topographic station S described above. By combining the preferred embodiments, optimization is ensured of the capabilities of each of the input apparatus to determine respectively the wind direction and speed and at least the geographical position of the pair of target points X and Y.

The external computing unit EC may be placed anywhere in respect to the turbine T, lidar L and topographic station S as long as it is connected via the telecommunication network N to the lidar L and the topographic station S and, respectively in the preferred embodiment using the turbine computing unit TCU to said turbine computing unit TCU.

The system according to the invention is configured such that the external computing unit EC be able to determine wind yaw misalignment $\sigma_{avg}$ of the turbine T in respect to the wind direction based on the determinations received from the ground-based topographic station (S), and ground-based lidar L.

In a second aspect of the invention it is provided a method for determining the wind yaw misalignment of the horizontal axis on-shore wind turbine T using the system according to the invention. The method comprises seven steps to be carried out during the duration $\Delta t$.

The determination of the wind yaw misalignment according to the invention is finalized when the following conditions are fulfilled simultaneously:
the speed of the wind is comprised in the interval between $v_1$-$v_2$ inclusively,
the wind turbine T has no internal or external limitations such as power limitations, aerodynamic errors or any other errors that may affect the working of the turbine T.

The reasoning of the first condition is explained below:
in case the wind speed v is below $v_1$ the lidar measuring and computing unit LMCU cannot determine accurately its direction;
in case the wind speed v is above $v_2$, the lidar measuring and computing unit LMCU is still capable of accurately measuring speed and determining direction, however the topographic station measuring and computing unit SMCU cannot measure accurately the distances to the pair of target points X and Y, said distance being necessary for the determination of the geographical position of the pair of target points X and Y, because the back and forth oscillation of the nacelle 4 is amplified too much by the wind 4 and the fact that the ensemble tower 5 and nacelle 4 is a flexible structure.

Both $v_1$ and $v_2$ depend on the characteristics of the turbine T, such as but not limited to the size and weight of the turbine T, the hub height HH, the degree of flexibility of the nacelle 4.

The reasoning of the second condition is explained below:
internal limitations refer to any failure or malfunction that can affect the functioning of the turbine T at its corresponding pre-determined parameters;
external limitations refer to any type of limitations of the quantity of energy to be provided by the turbine T as a result of the requirements of the energy company that buys and/or transports the energy generated by the plurality of turbines T;

aerodynamic errors or any other errors that may affect the working of the turbine refer in general to errors of measurement due to atmospheric conditions that impair the functioning of the turbine T: fog, ice on the rotor blades, heavy rain.

The method is applied for each turbine T for the duration $\Delta t$ when both the lidar L and the topographic station S are mounted, each in its corresponding reference position at the beginning of the duration $\Delta t$, and when the lidar L and the topographic station S are connected via the telecommunication network N to the external computer EC. During the method, both the lidar L and the topographic station S remain fixed, whereas the nacelle 4 moves depending on the wind direction to a plurality of positions i on each side of the projection on the ground of the rotor shaft 3 horizontal axis reference position.

In step 1 of the method, the lidar measuring and computing unit LMCU of the ground-based lidar L determines for a n number of times during the duration $\Delta t$ the angle $\theta$ of the wind direction in respect to the Geographical North at essentially the hub height HH.

At the same time, the lidar measuring and computing unit LMCU determines the wind speed v at essentially the hub height HH and sends the results of determinations to the external computing unit EC via the telecommunication network N;

At the same time, the topographic station measuring and computing unit SMCU determines for a m number of times during the duration $\Delta t$, including at the start of said duration $\Delta t$, the at least the geographical position of the pair of target points X and Y, and sends the results of determinations together to the external computing unit EC via the telecommunication network N. For automated topographic stations S, the number m of determinations of the angle $\epsilon$ of the orientation of the nacelle 4 takes place uniformly spanning across the entire duration $\Delta t$. For manual topographic stations S, the number m of determinations of the angle $\epsilon$ of the orientation of the nacelle 4 may be either grouped together, case in which the determinations take place at the beginning of the method or may be grouped in smaller groups of determinations $m_1, m_2, m_n$, where $\Sigma m_i = m$, in the latter case one of the groups m, taking place at the beginning of the method.

In step 2 of the method, the external computing unit EC receives the input data via the telecommunication network N: the angle $\theta$ of the wind direction, and the at least geographical position of the pair of target points X and Y.

The external computing unit EC unifies, if necessary, the units of measurement of the angles, then stores said input data and sorts same on a time-stamp basis using for example as reference the lidar time stamps.

In step 3 of the method, the external computing unit EC determines the angle $\epsilon$ of the orientation of the nacelle 4 in respect to the Geographical North based the geographical position of the pair of target points X and Y, and stores the result of this step.

If the topographic station measuring and computing unit SMCU is able to determine said angle $\epsilon$ of the orientation of the nacelle 4, the external computing unit EC retrieves in this step same angle $\epsilon$ of the orientation of the nacelle 4 as received from the topographic station measuring and computing unit SMCU;

If the topographic station measuring and computing unit SMCU is not able to determine said angle $\epsilon$ of the orientation of the nacelle 4, the external computing unit EC determines in this step the angle $\epsilon$ of the orientation of the nacelle 4 using the geographical position of the pair of target points X and Y received from the topographic station measuring and computing unit SMCU.

The determined angle $\epsilon$ of the orientation of the nacelle 4 represents an accurate determination of the real orientation of the nacelle 4 in respect to the North, based on the known precision of determinations by the topographic stations in general.

In step 4 of the method, the external computing unit EC applies a validation condition by checking if the angle $\theta$ of the wind direction has a value which is comprised within the values of a closed interval defined by the pre-determined maximum value $\alpha_{max}$ of the angle $\alpha_i$, on each of the sides of the rotor shaft 3 horizontal axis reference position, selects only the values of the angle $\theta$ of the wind direction that satisfy said validation condition, and determines an adjusted angle $\theta_{adj}$ of the wind direction for each of the validated values using a first compass rose condition, and stores the result of this step.

Application of the validation condition is necessary in order to limit the range of the peak absolute instant values used for the determination of the averaged wind yaw misalignment $\sigma_{avg}$ in S7 and limiting the errors of determination of the angle $\theta$ of the wind direction.

One of the sources of peak values is the way angles are expressed. Considering the rose compass that has 360° and two arbitrary points on its circumference, one placed at 30° and the other one at 350°, the difference of angles between the two arbitrary points can either be calculated as 350°−30°=320° or as)(360°−350°+30°=40°. When calculating averages, in order to eliminate peak values, it is preferable to use the angle of 40° rather than the angle of 320°, this is why adjustment of the angles $\theta$ of the wind direction is necessary.

The errors of determination of the values of the angle $\theta$ of the wind direction as received in S2 may occur because of the change of the relative position of the nacelle 4 in respect to the position of the lidar L over the duration $\Delta t$, for example the lidar L may be behind the nacelle 4.

The determinations of the angle $\theta$ of the wind direction by the lidar measuring and computing unit LMCU are influenced by the position of the lidar L in respect to the nacelle 4 during the measurements on which determinations of the angle $\theta$ of the wind direction are based. The inventors came to the conclusion that minimum measurement and determination errors are obtained if the angle $\alpha_i$ on both sides of the rotor shaft 3 horizontal axis does not exceed the maximum pre-determined value $\alpha_{max}$. For limiting measurement and determination errors only those instant values of the angle $\theta$ of the wind direction determined while the lidar L is in front of the turbine T are validated.

In one non-limiting example, $\alpha_{max}=30°$, thus the relative position of the nacelle 4 during the measurements must not exceed 30° in both sides of the rotor shaft 3 horizontal axis in order to validate the values of the angle $\theta$ of the wind direction The finding of the inventors is based on the fact that during measurements, if the axis of the rotor shaft 3 of the nacelle 4 is placed outside a validation interval of $2 \times \alpha_{max}=60°$, there are more probabilities that the blades 1 produce disturbances that alter the result of the determinations of the angle $\theta$ of the wind direction.

The relative position of the lidar L in respect to the nacelle 4 over the duration $\Delta t$ can be determined knowing the lidar reference position B and the orientation of the nacelle 4 as determined angle $\epsilon$. For example, for simplicity, in the lidar reference position B, the lidar L is oriented towards North (0°). Thus, the validation interval of $2\times\alpha_{max}=60°$ in this case is from 330° to 30° or may be expressed alternatively as being from −30° to 30°. If during measurements, the orientation of the nacelle 4 makes an angle ε=300° with the Geographical North, this is outside the interval from 330° to 30°.

Different compass rose conditions may be set to accommodate specific conditions related to the characteristics of the turbine T such as but not limited to the size and weight of the turbine T, the hub height HH, the degree of flexibility of the nacelle 4, and of the lidar L.

A non-limiting example with reference to the above example in the when in lidar reference position B, the lidar L is oriented towards North, that is 0° and the validation interval is $2\times\alpha_{max}=60°$ is the following:

the validation condition: instant values of the angle θ of the wind direction are validated only if $330°\le\alpha_i<360°$ or $0°\le\alpha_i<30°$, For the instant values of the angle θ of the wind direction satisfying the validation condition above, the first compass rose condition for determining the adjusted angle $\theta_{adj}$ of the wind direction for each of the validated values is as follows: if $0°\le\theta\le180°$ then θadj=θ and if $180°<\theta<360°$ then θadj=0–360°. The first compass rose condition aims to select only those values having absolute values that is modulus of values between 0° and 180°.

In step 5 of the method, the external computing unit EC averages for the averaging duration Δtt, where Δtt<Δt the adjusted angle θadj of the wind direction, using the values determined in S4 as well as the wind speed v, resulting the averaged angle $\theta_{avg}$ of the wind direction and the averaged wind speed $\theta_{avg}$.

The averaging duration Δtt typically ranges between 2-5 min inclusively.

In this step, after averaging, the external computing unit EC verifies if the averaged wind speed $\theta_{avg}$ is comprised within the predetermined interval of wind speeds $v_1$-$v_2$ for which the steps 8 to 12 method are applied. If the averaged wind speed $v_{avg}$ is outside the predetermined interval of wind speeds $v_1$-$v_2$, steps 6 of the method is not applied as long as the averaged wind speed $v_{avg}$ is outside the predetermined interval of wind speeds $v_1$-$v_2$. However the first four steps of the method are still carried out until the averaged wind speed $v_{avg}$ is comprised again within the predetermined interval of wind speeds $v_1$-$v_2$.

Further on, the external computing unit EC stores the result of this step.

Figure 6:
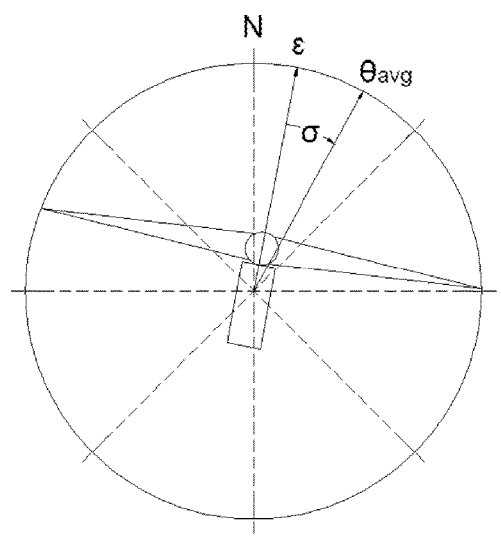

In step 6 of the method, with reference to FIG. 6, the external computing unit EC determines the wind yaw misalignment σ of the turbine T in respect to the wind direction as a difference between the averaged angle $\theta_{avg}$ of the wind direction and the angle ε of the orientation of the nacelle 4 The determination is made using the equation:

$$\sigma=\theta_{avg}-\varepsilon \qquad [E_q.4]$$

Further on, the external computing unit EC stores the result of this step.

In step 7 of the method, the external computing unit EC determines at the expiry of the duration Δt, the averaged wind yaw misalignment $\sigma_{avg}$ of the turbine T in respect to the wind direction corresponding to said duration Δt. Said averaged wind yaw misalignment $\sigma_{avg}$ of the turbine T is calculated as an arithmetic mean of the plurality of wind yaw misalignments σ during the duration Δt.

The averaged wind yaw misalignment $\sigma_{avg}$ is stored and compared with the pre-determined misalignment threshold in order to check if re-alignment into the wind of the turbine T must be carried out. Should the averaged wind yaw misalignment $\sigma_{avg}$ of the turbine T be higher than said pre-determined misalignment threshold an action must be taken to re-align the turbine T into the wind, said action being outside the scope of this invention.

The averaged wind yaw misalignment $\sigma_{avg}$ of the turbine T as a result of the method according to the invention has the advantage of representing a more accurate determination of the wind yaw misalignment of the turbine T as compared to prior art, because it is determined as an average of a plurality of values of the wind yaw misalignment σ of the turbine T, and each of the values of the wind yaw misalignment σ being determined based on values of the angle θ of the wind direction that are both adjusted to flatten the peak instant values and averaged.

Having in view the more accurate determination of the wind yaw misalignment of the turbine T, another advantage is that it improves the correction of the position of the nacelle in respect to the wind and in this way increases the yield of the production of energy of the turbine T.

If granularity of determinations of the topographic station measuring and computing unit SMCU is smaller than or equal to the pre-determined time-interval threshold that depends on the granularity of the determinations of the lidar L, it is accurate to use the plurality of instant values of the angle ε of the orientation of the nacelle 4 for the determination of averaged wind yaw misalignment $\sigma_{avg}$ of the turbine T, because the constant movement of the nacelle 4 is not expected to change radically in sub-minute intervals of times, thus no significant peaks nor errors are expected.

However, if granularity of determinations of the topographic station measuring and computing unit SMCU is larger than the pre-determined time-interval threshold, data is received by the external computing unit EC from lidar measuring and computing unit LMCU corresponding to instant determinations of the angle θ of the wind direction with a sub-minute granularity, whereas the data received by the external computing unit EC from the topographic station measuring and computing unit SMCU has a significantly larger granularity. This is the case when manual topographic stations S are used. The problem is what values of the angle ε of the orientation of the nacelle 4 to use between two successive m determinations, when said successive m determinations occur typically between 8-15 minutes.

For this reason, for the purpose of improving the accuracy of the determination of the yaw misalignment σ of the turbine T if granularity of determinations of the topographic station measuring and computing unit SMCU is larger than the pre-determined time-interval threshold, an adjusted angle $\varepsilon_{adj}$ of the orientation of the nacelle 4 is used in S6 instead of the angle ε of the orientation of the nacelle 4. This means that, in a preferred embodiment, S1, S2 and S6 of the method are modified and three new steps are added between S5 and S6.

In this preferred embodiment, the method includes an additional sub-step in step 1 and an additional sub-step in step 2:

In sub-step 1A, the turbine computing unit TCU determines the averaged angles $\omega_{avg}$ of position of the nacelle 4 in respect to the Geographical North and sends same to the external computing unit EC via the telecommunication network N.

In sub-step 2A, the external computing unit EC receives from the turbine computing unit TCU of the averaged angle $\omega_{avg}$ of position of the nacelle 4 via the telecommunication network N; In this preferred embodiment, the method includes three new steps between S5 and S6.

In step 5.1. the external computing unit EC determines an averaged correction angle $k_{avg}$ of the nacelle 4, for correcting the position of said nacelle 4 in respect to the Geographical North, as an average of a plurality of nacelle correction angles k, each of the nacelle correction angle k determined using the equation:

$$k=\varepsilon-\omega_{avg} \qquad [\text{Eq.5}]$$

and stores the result of this step.

The nacelle correction angle k is the difference between the angle $\varepsilon$ of the orientation of the nacelle 4 determined by the topographic station S, and respectively the averaged angle $\omega_{avg}$ of position of the nacelle 4 by the turbine computing unit TCU reflecting the difference of accuracy when making determinations by the two input apparatus, the topographic station S and the turbine computing unit TCU.

Given that the determinations of the averaged angle $\omega_{avg}$ of position of the nacelle 4 are made with a smaller granularity than the determinations of the angle $\varepsilon$, between two successive determinations of said angle $\varepsilon$, previous instant value of the angle $\varepsilon$ of the orientation of the nacelle 4 is used. Thus, for example, determination $m_i$ of the angle $\varepsilon$ of the orientation of the nacelle 4 takes place at 9.00 and the subsequent determination $m_{i+1}$ of the angle $\varepsilon$ of the orientation of the nacelle 4 takes place at 9.15, in this time interval of 15 minutes, the averaged angle $\omega_{avg}$ of position of the nacelle 4 has a plurality of instant values, whereas the angle $\varepsilon$ of the orientation of the nacelle 4 has a single value, that is the value determined at 9.00. This is why the nacelle correction angles k are averaged.

The determination of the averaged correction angle $k_{avg}$ of the nacelle 4 may be carried out in different ways taking into account various factors such as but not limited to:

the characteristics of the turbine T, such as but not limited to the size and weight of the turbine T, the hub height HH, the degree of flexibility of the nacelle 4, the characteristics of the wind as far as relative stability of its direction and speed.

In a preferred embodiment, the averaged correction angle $k_{avg}$ of the nacelle 4 is calculated as an arithmetic mean of the plurality of nacelle correction angles k from the start of the method and up to and including the instant determination of the nacelle correction angle k.

In step 5.2, the external computing unit EC determines a corrected angle $\varepsilon_k$ of position of the nacelle 4, said corrected angle $\varepsilon_k$ representing the result of the correction of the averaged angle $\omega_{avg}$ of position of the nacelle 4 with the nacelle averaged correction angle $k_{avg}$, and stores the result of this step. The determination is made using the equation:

$$\varepsilon_k=k_{avg}+\omega_{avg} \qquad [\text{Eq.6}]$$

In step 5.3, the external computing unit EC applies a validation condition by checking if the corrected angle $\varepsilon_k$ the nacelle 4 has a value which is comprised within the values of a closed interval defined by the pre-determined maximum value $\alpha_{max}$ of the angle $\alpha_i$, on each of the sides of the rotor shaft 3 horizontal axis reference position, in order to select only the values of the corrected angle $\varepsilon_k$ the nacelle 4 that satisfy said validation condition, and determines an adjusted angle $\varepsilon_{adj}$ of the position of the nacelle 4 using a second compass rose condition, and stores the result of this step.

The adjustment is made by applying the second compass rose condition that may be different than the first compass rose condition. Therefore, using the same example as in S5.1.2 the application of the second compass rose condition is illustrated below:

if $\omega_{avg}+k_{avg}>360°$, then $\varepsilon_k=\omega_{avg}+k_{avg}-360°$ Example: $\omega_{avg}=180°$, $k_{avg}=190°$, $\varepsilon_k=370°-360°=10°$ if $\omega_{avg}+k_{avg}\leq360°$, then $\varepsilon_k=\omega_{avg}+k_{avg}$ Example: $\omega_{avg}=180°$, $k_{avg}=170$, $\varepsilon_k=350°$ The adjusted angle $\varepsilon_{adj}$ of the position of the nacelle 4 is used in the modified step 6, instead of the instant value of the angle $\varepsilon$ of the orientation of the nacelle 4 for determining the wind yaw misalignment $\sigma$ using the equation:

$$\sigma=\theta_{avg}-\varepsilon_{adj} \qquad [\text{Eq.4A}]$$

The averaged wind yaw misalignment $\sigma_{avg}$ of the turbine T as disclosed in the preferred embodiment has the advantage of making best use of the capabilities of each of the three input apparatus: the lidar L, the topographic station S and the turbine T reducing in this way the impact of the inherent errors of design of the system of determining azimuthal direction by the computer of the turbine T.

The fact that it is possible to determine in step 5.1 the averaged correction angle $k_{avg}$ represents another advantage of the invention because it allows to adapt the method and the system of the invention to the characteristics of each of the three input apparatus in order to obtain the highest yield of the production of energy of said turbine T.

In a third aspect of the invention it is provided a computer program comprising instructions which, when the program is executed by the external computing unit EC of the system causes the computer to carry out the steps of the method from step 2 until step 7 inclusive.

In a fourth aspect of the invention, it is provided the external computing unit EC of the system having stored thereon the computer program for carrying out the steps of the method from step 4 until step 7 inclusive.

It is possible, in another preferred embodiment of the invention, to configure the turbine computing unit TCU, by means of the computer program, such that said turbine computing unit TCU be the external computing unit EC. This possibility is an advantage because it improves the functioning of an existing input apparatus without the need of another computing machine.

While the description of the invention was disclosed in detail in connection to the preferred embodiments, those skilled in the art will appreciate that all preferred embodiments serve only for a better understanding of the invention and shall not limit the invention to it and that changes may be made to adapt a particular situation without departing from the essential scope of the invention.

The invention claimed is:

1. A system for determining wind yaw misalignment of a horizontal axis on-shore wind turbine (T), the system comprising the wind turbine (T), and the wind turbine (T) comprising a plurality of rotor blades (1), a rotor hub (2) situated at a hub height (HH), a rotor shaft (3) having a rotor shaft (3) horizontal axis, a nacelle (4), a tower (5) having a tower base, and a pair of target points X and Y on an external surface of the nacelle (4) on a side of the nacelle (4) facing the ground that are arranged such that geographical positions of the target points X and Y are determinable by a ground-based topographic station (S), and such that a segment X-Y connecting the target points X and Y corresponds to the longitudinal axis of the side of the nacelle (4) facing the ground, the target point X being placed at an extremity of the nacelle (4) opposed to the plurality of rotor blades (1) and the target point Y being placed in an immediate vicinity of the tower (5), wherein the turbine (T) has a turbine reference position, wherein in which the rotor shaft (3) has a rotor shaft (3) horizontal axis reference position, wherein the system further comprises:
- a ground-based lidar (L), an axis of the ground-based lidar (L) being mounted vertically, the lidar (L) comprising a lidar measuring and computing unit (LMCU), and the lidar measuring and computing unit (LMCU) configured to:
  - determine an angle θ of the wind direction in respect to the Geographical North at essentially the hub height (HH),
  - determine a wind speed v proximal to the hub height (HH), and
  - send via a telecommunication network (N) to an external computing unit (EC) a result of the determinations;
  - wherein the lidar (L) has a lidar reference position (B), in which the lidar (L) is placed on the ground in front of the turbine (T) in a turbine reference position on a projection on the ground of the rotor shaft (3) horizontal axis reference position, at a distance $d_1$ from the projection on the ground (C1) of an extreme point (C) of the rotor hub (2), and
  - wherein the nacelle (4) is movable depending on a wind direction to a plurality of positions i on each side of the projection on the ground of the rotor shaft (3) horizontal axis reference position, making an angle $\alpha_i$ between the projection on the ground of the rotor shaft (3) horizontal axis reference position and a projection on the ground of the rotor shaft (3) horizontal axis corresponding to each of the plurality of positions i,
- the ground-based topographic station (S), comprising a topographic station measuring and computing unit (SMCU), the topographic station measuring and computing unit (SMCU) configured to
  - determine at least the geographical position of the target points X and Y;
  - send via the telecommunication network (N) to the external computing unit (EC) a results of the determination;
  - wherein the ground topographic station (S) is placed in either of two topographic station reference positions (D)' and (D)" behind the rotor hub (2) and laterally in respect to the projection on the ground of the rotor shaft (3) reference position horizontal axis at a distance $d_2$ from the base of the tower (5), such that, when the nacelle (4) is movable depending on the wind direction,
  - wherein the rotor blades (1) do not interfere with a laser beam of the topographic station measuring and computing unit (SMCU), and
  - wherein the topographic station measuring and computing unit (SMCU) is configured to determine the geographical position of the pair of the target points X and Y of the nacelle (4) during the movement of said nacelle (4) to the plurality of positions I;
- the external computing unit (EC) configured to:
  - receive the input data via the telecommunication network (N):
    - the angle θ of the wind direction from the lidar measuring and computing unit (LMCU), and
    - the geographical position of the target points X and Y, from the topographic station measuring and computing unit (SMCU);
  - store the received input data;
  - determine an angle ε of the orientation of the nacelle (4) in respect to geographical north based the geographical position of the target points X and Y, and to store each determination;
  - determine an adjusted angle $\theta_{adj}$ of the wind direction;
  - average the adjusted angle $\theta_{adj}$ of the wind direction and the wind speed v, to verify if the averaged wind speed $v_{avg}$ is within a predetermined interval of wind speeds $v_1$-$v_2$ for which wind yaw misalignment can be determined, and to store the averaged angle $\theta_{avg}$ of the wind direction and the averaged wind speed $v_{avg}$;
  - determine a wind yaw misalignment σ of the turbine T in respect to the wind direction and to store each determination;
  - determine an averaged wind yaw misalignment $\sigma_{avg}$ of the turbine (T) in respect to the wind direction corresponding to a duration Δt, to store the averaged misalignment $\sigma_{avg}$ and to compare said average misalignment $\sigma_{avg}$ with a pre-determined misalignment threshold,
- the telecommunication network (N) configured to:
  - ensure communication between the external computing unit (EC) and the lidar measuring and computing unit (LMCU) and the topographic station (S)
  - wherein the system is configured such that the external computing unit (EC) is able to determine wind yaw misalignment $\sigma_{avg}$ of the turbine (T) in respect to the wind direction based on the determinations received from the ground-based topographic station (S) and the ground-based lidar (L).

2. The system of claim 1, wherein when a granularity of the determinations of the topographic station measuring and computing unit (SMCU) is greater than a pre-determined time-interval threshold, the system further comprises a turbine computing unit (TCU) of the turbine (T), the turbine computing unit (TCU) configured to determine an averaged angle $\omega_{avg}$ of position of the nacelle (4) in respect to the Geographical North and further configured to send a result of the determinations to the telecommunication network N,
  wherein the external computing unit (EC) is further configured to:
   receive via the telecommunication network (N) the averaged angle $\omega_{avg}$ of position of the nacelle (4),
   determine an averaged correction angle $k_{avg}$ of the nacelle (4), for correcting the position of said nacelle (4), and to store each determination,
   determine a corrected angle $\varepsilon_k$ of position of the nacelle (4) in respect to the Geographical North, and to store each determination,
   determine an adjusted angle $\varepsilon_{adj}$ of the orientation of the nacelle (4) in respect to the Geographical North, and to store each determination, and
  wherein the telecommunication network N is further configured to ensure communication between the external computing unit (EC) and the turbine computing unit (TCU).

3. The system of claim 2, wherein the turbine measuring unit (TMU) comprises an ultrasonic anemometer.

4. The system of claim 1, wherein the distance $d_1$ depends on a value of an angle A of emission of the laser beam spinning around the vertical axis (AB) of the lidar (L), and on a value of the hub height (HH), and wherein the distance $d_1$ satisfies:

$$d_{1min}=tg(\lambda)*HH \quad d_{1max}=tg(\lambda)*2*HH$$

5. The system of claim 1, wherein the distance $d_2$ depends on the hub height (HH) and on a capability of the topographic station measuring and computing unit (SMCU) to determine the geographical position of the points X and Y, and wherein the distance $d_2$ satisfies:

$$d_{2min}=2*HH, \text{ wherein 2 is a constant}$$

6. A method for determining wind yaw misalignment of a horizontal axis on-shore wind turbine (T), comprising:
   during a duration $\Delta t$:
      determining for n number of times, by a lidar measuring and computing unit (LMCU) of a ground-based lidar (L), an angle $\theta$ of a wind direction in respect to a geographical north proximal to the hub height (HH),
      determining by the lidar measuring and computing unit (LMCU), the wind speed v proximal to the hub height (HH), and
      sending, by the lidar measuring and computing unit (LMCU), a result of the determinations to an external computing unit (EC) a the telecommunication network (N);
   determining for a m number of times, by a topographic station measuring and computing unit (SMCU), at least the geographical position of target points X and Y, and sending a result of the determinations to the external computing unit (EC) via the telecommunication network (N),
   receiving by the external computing unit (EC) of the input data via the telecommunication network (N), the angle $\theta$ of the wind direction and the at least geographical position of the target points X and Y, and storing received input data;
   determining y the external computing unit (EC) of the angle $\varepsilon$ of the orientation of the nacelle (4) in respect to geographical north based the geographical position of the target points X and Y, and storing a result of the determining,
   applying a validation condition by checking whether the angle $\theta$ of the wind direction has a value which is within values of a closed interval defined by the pre-determined maximum value $\alpha_{max}$ of the angle $\alpha_i$, on each side of a rotor shaft 3 horizontal axis reference position, selecting only the values of the angle $\theta$ of the wind direction that satisfy the validation condition;
   determining an adjusted angle $\theta_{adj}$ of the wind direction for each of the selected values using a first compass rose condition, and storing the result of the determination;
   averaging by the external computing unit (EC) for an averaging duration $\Delta tt$, where $\Delta tt<\Delta t$, of the adjusted angle $\theta_{adj}$ of the wind direction and of the wind speed v, resulting in the averaged angle $\theta_{avg}$ of the wind direction and the averaged wind speed $v_{avg}$;
   verifying whether the averaged wind speed $v_{avg}$ is within the predetermined interval of wind speeds $v_1$-$v_2$, and storing the result of the verification,
   determining by the external computing unit (EC) of the wind yaw misalignment $\sigma$ of the turbine (T) in respect to the wind direction as a difference between the averaged angle $\theta_{avg}$ of the wind direction and the angle $\varepsilon$ of the orientation of the nacelle (4), using: $\sigma=\theta_{avg}-\varepsilon$, and storing a result of the determining;
   determining by the external computing unit (EC) at an expiration of the duration $\Delta t$, of the averaged wind yaw misalignment $\sigma_{avg}$ of the turbine (T) in respect to the wind direction corresponding to said duration $\Delta t$ as an arithmetic mean of the plurality of values of the wind yaw misalignment $\sigma$ during the duration $\Delta t$, storing the averaged misalignment $\sigma_{avg}$ of the turbine (T) and comparing said average misalignment $\sigma_{avg}$ with the pre-determined misalignment threshold in order to determine whether re-alignment into the wind of the turbine (T) is to be carried out.

7. The method of claim 6, wherein when a granularity of determinations of the topographic station measuring and computing unit (SMCU) is greater than a pre-determined time-interval threshold, for a purpose of improving an accuracy of the determination of the yaw misalignment $\sigma$ of the turbine (T), an adjusted angle $\varepsilon_{adj}$ of the orientation of the nacelle (4) is used to determine the orientation of the nacelle (4), and wherein the method comprises:
   determining averaged angles $\omega_{avg}$ of a position of the nacelle 4 in respect to the Geographical North by the turbine computing unit TCU and sending the averaged angles to the external computing unit EC via the telecommunication network N;
   receiving by the external computing unit (EC) from the turbine computing unit (TCU) of the averaged angle $\omega_{avg}$ of position of the nacelle (4) via the telecommunication network (N);
   determining by the external computing unit (EC) an averaged correction angle $k_{avg}$ of the nacelle 4, for correcting the position of said nacelle 4 in respect to the Geographical North, as an average of a plurality of nacelle correction angles k, each of the nacelle correction angle k being determined to satisfy:

$$k=\varepsilon-\omega_{avg};$$

storing a result of determining the averaged correction angle $k_{avg}$;
   determining by the external computing unit (EC) of a corrected angle $\varepsilon_k$ of position of the nacelle (4), a corrected angle $\varepsilon_k$ representing a result of the correction of the averaged angle $\omega_{avg}$ of position of the nacelle 4 with the nacelle averaged correction angle $k_{avg}$, satisfying:

$$\varepsilon_k=k_{avg}+\omega_{avg};$$

storing a result of determining the corrected angle $\varepsilon_k$,
   applying a validation condition by checking whether the corrected angle $\varepsilon_k$ the nacelle (4) has a value which is within a closed interval of values defined by the pre-determined maximum value $\alpha_{max}$ of the angle $\alpha_i$, on each of the sides of the rotor shaft 3 horizontal axis reference position;
   selecting only the values of the corrected angle $\varepsilon_k$ the nacelle (4) that satisfy the validation condition;
   determining an adjusted angle $\varepsilon_{adj}$ of the position of the nacelle (4) using a second compass rose condition;
   storing a result of determining the adjusted angle $\varepsilon_{adj}$;
   using the adjusted angle $\varepsilon_{adj}$ instead of the angle $\varepsilon$ of the orientation of the nacelle (4) in determining the wind yaw misalignment $\sigma$, so as to satisfy:

$$\sigma=\theta_{avg}\varepsilon_{adj}; \text{ and}$$

storing a result of determining the wind yaw misalignment $\sigma$.

8. The method of claim 6, wherein for each instant determination of the nacelle correction angle k, the averaged correction angle $k_{avg}$ of the nacelle (4) is calculated as an arithmetic mean of the plurality of nacelle correction angles k.

9. A system comprising:
one or more processors; and
one or more non-transitory machine-readable storage devices storing instructions that are executable by the one or more processors to perform operations for determining wind yaw misalignment of a horizontal axis on-shore wind turbine (T), the operations comprising:
during a duration $\Delta t$:
determining for n number of times, by a lidar measuring and computing unit (LMCU) of a ground-based lidar (L), an angle $\theta$ of a wind direction in respect to a geographical north proximal to the hub height (HH),
determining by the lidar measuring and computing unit (LMCU), the wind speed v proximal to the hub height (HH), and
sending, by the lidar measuring and computing unit (LMCU), a result of the determinations to an external computing unit (EC) a the telecommunication network (N);
determining for a m number of times, by a topographic station measuring and computing unit (SMCU), at least the geographical position of target points X and Y, and sending a result of the determinations to the external computing unit (EC) via the telecommunication network (N),
receiving by the external computing unit (EC) of the input data via the telecommunication network (N), the angle $\theta$ of the wind direction and the at least geographical position of the target points X and Y, and storing received input data;
determining y the external computing unit (EC) of the angle $\epsilon$ of the orientation of the nacelle (4) in respect to geographical north based the geographical position of the target points X and Y, and storing a result of the determining,
applying a validation condition by checking whether the angle $\theta$ of the wind direction has a value which is within values of a closed interval defined by the pre-determined maximum value $\alpha_{max}$ of the angle $\alpha_i$, on each side of a rotor shaft 3 horizontal axis reference position,
selecting only the values of the angle $\theta$ of the wind direction that satisfy the validation condition;
determining an adjusted angle $\theta_{adj}$ of the wind direction for each of the selected values using a first compass rose condition, and storing the result of the determination;
averaging by the external computing unit (EC) for an averaging duration $\Delta tt$, where $\Delta tt < \Delta t$, of the adjusted angle $\theta_{adj}$ of the wind direction and of the wind speed v, resulting in the averaged angle $\theta_{avg}$ of the wind direction and the averaged wind speed $v_{avg}$;
verifying whether the averaged wind speed $v_{avg}$ is within the predetermined interval of wind speeds $v_1$-$v_2$, and storing the result of the verification,
determining by the external computing unit (EC) of the wind yaw misalignment $\sigma$ of the turbine (T) in respect to the wind direction as a difference between the averaged angle $\theta_{avg}$ of the wind direction and the angle $\epsilon$ of the orientation of the nacelle (4), using: $\sigma = \theta_{avg} - \epsilon$, and storing a result of the determining;
determining by the external computing unit (EC) at an expiration of the duration $\Delta t$, of the averaged wind yaw misalignment $\sigma_{avg}$ of the turbine (T) in respect to the wind direction corresponding to said duration $\Delta t$ as an arithmetic mean of the plurality of values of the wind yaw misalignment $\sigma$ during the duration $\Delta t$, storing the averaged misalignment $\sigma_{avg}$ of the turbine (T) and comparing said average misalignment $\sigma_{avg}$ with the pre-determined misalignment threshold in order to determine whether re-alignment into the wind of the turbine (T) is to be carried out.

10. The system of claim 9, wherein for each instant determination of the nacelle correction angle k, the averaged correction angle $k_{avg}$ of the nacelle (4) is calculated as an arithmetic mean of the plurality of nacelle correction angles k.

* * * * *